United States Patent
Barton et al.

(10) Patent No.: US 7,171,407 B2
(45) Date of Patent: Jan. 30, 2007

(54) METHOD FOR STREAMING XPATH PROCESSING WITH FORWARD AND BACKWARD AXES

(75) Inventors: Charles Barton, Haworth, NJ (US); Philippe Charles, Millwood, NY (US); Deepak Goyal, Elmsford, NY (US); Mukund Raghavachari, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 10/264,076

(22) Filed: Oct. 3, 2002

(65) Prior Publication Data

US 2004/0068487 A1 Apr. 8, 2004

(51) Int. Cl.
*G06F 17/30* (2006.01)
(52) U.S. Cl. .................... 707/4; 707/1; 707/3
(58) Field of Classification Search ............ 707/1–10, 707/100; 715/500, 907
See application file for complete search history.

(56) References Cited

U.S. PATENT DOCUMENTS

| | | | |
|---|---|---|---|
| 6,094,652 A * | 7/2000 | Faisal | 707/5 |
| 6,199,062 B1 * | 3/2001 | Byrne et al. | 707/3 |
| 6,279,007 B1 * | 8/2001 | Uppala | 707/101 |
| 6,442,545 B1 * | 8/2002 | Feldman et al. | 707/6 |
| 6,721,727 B2 * | 4/2004 | Chau et al. | 707/3 |
| 6,917,935 B2 * | 7/2005 | Zwiegincew et al. | 707/4 |
| 6,917,937 B1 * | 7/2005 | Rubendall | 707/5 |
| 7,054,859 B2 * | 5/2006 | Kuno et al. | 707/5 |
| 2003/0167163 A1 * | 9/2003 | Glover et al. | 704/9 |
| 2003/0212664 A1 * | 11/2003 | Breining et al. | 707/3 |

* cited by examiner

*Primary Examiner*—Don Wong
*Assistant Examiner*—Marc R. Filipczyk
(74) *Attorney, Agent, or Firm*—Michael J. Buchenhorner; Casey P. August (57) ABSTRACT

A system and method for processing documents, such as XML documents, wherein the method includes the steps of: receiving a query comprising search criteria; receiving at least a portion of a document; modifying the search criteria such that constraints specifying a backward relation may be reformulated into constraints specifying a forward relation; processing the document using the modified criteria; and locating one or more nodes that satisfy the search criteria; and, emitting the selected nodes as output.

17 Claims, 10 Drawing Sheets

/descendant::y[child::u]/descendant::w[ancestor::z/child::v]

METHOD FOR STREAMING XPATH PROCESSING WITH FORWARD AND BACKWARD AXES

FIELD OF THE INVENTION

The invention disclosed broadly relates to the field of information handling systems, and more particularly relates to the field of searching data structures.

BACKGROUND OF THE INVENTION—DEFINITION OF TERMS

XML—eXtensible Markup Language (XML) describes a class of data objects called XML documents and partially describes the behavior of computer programs which process them. XML documents are made up of storage units called entities, which contain either parsed or unparsed data. Each XML document contains one or more elements, the boundaries of which are either delimited by start-tags and end-tags, or, for empty elements, by an empty-element tag.

XPath—XML PATH Language. XPath 1.0, a language for addressing parts of XML documents, is an integral component of languages for XML processing such as extensible Stylesheet Language Transformation (XSLT) and XQuery. Alan Freedman, *Computer Desktop Encyclopedia*, 9$^{th}$ Edition, Osborne/McGraw-Hill (2001) (hereafter, "Freedman").

XSLT—eXtensible Stylesheet Language Transformation. A language for transforming XML documents into other XML documents.

Xalan—Xalan is an implementation of XSLT from Apache.

DOM—Document Object Model. The Document Object Model is a platform- and language-neutral interface that will allow programs and scripts to dynamically access and update the content, structure and style of XML documents. The document can be further processed and the results of that processing can be incorporated back into the presented page.

SAX—Simple API for XML. An event-based programming interface (API) between an XML parser and an XML application. An object-based interface is supplied by DOM. Freedman.

Streaming Processing of XML—Streaming processing of XML documents is a name given to a type of processing of an XML document in which the document does not have to be stored in the memory and each node in the document is visited at most once. Streaming is a general concept. Streaming XPath processing refers to evaluating an XPath expression while "streaming" over an XML document.

BACKGROUND—DESCRIPTION OF RELATED ART

Event-based Parsing

An event-based parser, for example, a SAX parser, scans an XML document, producing events as it recognizes element tags and other components of the document. Each event conveys the name and level of the corresponding element. The production of events is equivalent to that of a depth-first, pre-order traversal of the document tree, where for each element, a start element event is generated, then its subtree is processed in depth-first order, and finally, an end element event is generated. Event-based parsers do not build trees, they just relay what the begin/end tags (events) are. These events are received by the client of the event-based parser. The client has the flexibility to handle these events in any way it chooses, including storing some of the events, and discarding others.

XPath

As stated above, XPath is a language for addressing parts of XML documents, and is an integral component of languages such as XSLT and XQuery. The performance of implementation of these languages depends on the efficiency of the underlying XPath engine. XPath expressions have also been used as a general purpose mechanism for accessing portions from XML documents, for example, an XPath-based Application Program Interface (API) is provided in Document Object Model (DOM) 3 for traversing DOM trees. XPath expressions have found use in publish-subscribe systems as a mechanism for specifying content-based subscriptions.

Most current XPath engines, for example, the one provided with Xalan, require that the entire document be in memory before evaluating an XPath expression. For large documents, this approach may result in unacceptable overhead. Furthermore, the XPath engine in Xalan evaluates XPath expressions in a naïve manner, and may perform unnecessary traversals of the input document. For example, consider an expression such as /descendant::x/ancestor::y, which selects all y ancestors of x elements in the document. The Xalan XPath engine evaluates this expression by using one traversal over the entire document to find all the x elements, and for each x element, a visit to each of its ancestors to find appropriate y elements. As a result, some elements in the document are visited more than once. Suppose one wishes to find all persons (nodes) named "John" that have an ancestor named "Fred." The Xalan engine would traverse the entire document to visit each "John" node. For each such "John" node, it would go through each of its ancestor nodes to determine if any of them is named "Fred". It will then return all such "Fred" nodes. As is evident, each of the ancestors of a "John" node is visited at least twice, once during the traversal to locate the "John" node and once during the traversal from the "John" node to locate a "Fred" node.

Streaming XPath Processing

In many environments, a natural way of processing XML documents is to stream over them, i.e., evaluate the query on the input document as it is parsed, storing only portions of the document relevant to the result of the query.

The premise of streaming XPath is that, in many instances, XPath expressions can be evaluated in one depth-first, document-order traversal of an XML document. The primary benefits of streaming XPath are: it optimizes memory utilization by storing only the portion of the document relevant to the evaluation of the XPath, rather than storing the entire document in memory; and it speeds up execution time, because the algorithm visits each node in the document exactly once, avoiding unnecessary traversals.

The limitation with the known method for processing streaming XPath is that it can only be done on expressions that contain only uses of forward axes. If the expression contains a backward axis (such as parent or ancestor), you could not use known streaming XPath processing algorithms for such an expression.

Figure 1:
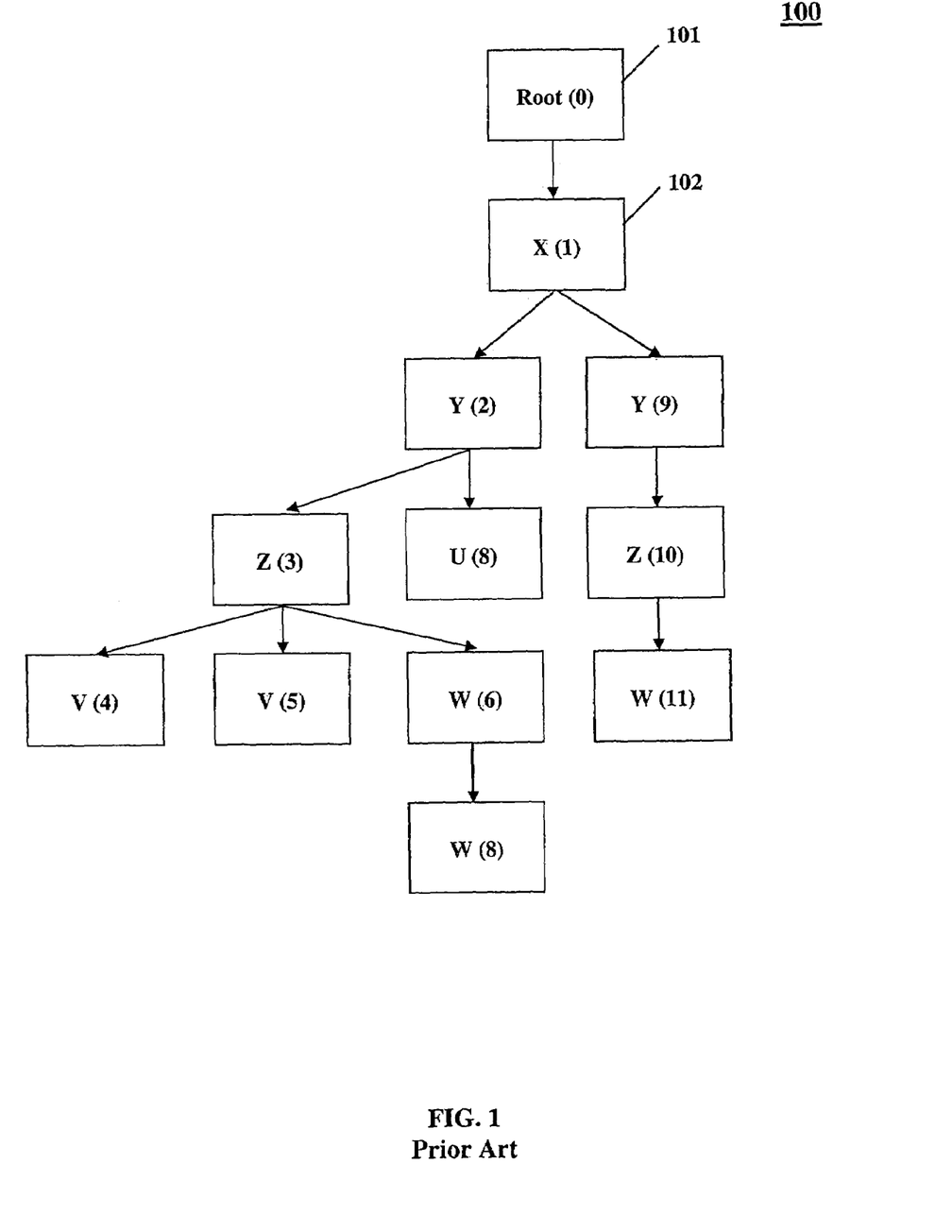
FIG. 1 shows a tree representation of an XML document, according to the prior art.

FIG. 1—Tree Representation of XML Document

A tree is a data structure composed of nodes. One of the nodes is specially designated to be the root node. All nodes in the tree other than the root node have exactly one parent node in the tree. An XML document can be represented as a tree, whose nodes represent the structural components of the document—elements, text attributes, comments, and processing instructions. Parent-child edges in the tree represent the inclusion of the child component in its parent element, where the scope of an element is bounded by its start and end tags. The tree corresponding to an XML document is rooted at a virtual element, Root, which contains the document element. We will, henceforth, discuss XML documents in terms of their tree representation. One can define an arbitrary order on the nodes of a tree. One such order might be based on a left-to-right depth first traversal of the tree, which, for a tree representation of an XML document, corresponds to the document order.

Given an order on a tree, we can define a notion of a forward and backward relation on a tree. A relation R is a forward relation if whenever two nodes x and y are related by R, it must be the case that x precedes y in the order on the tree. Similarly, a relation is a backward relation if whenever x is related to y, then it must be the case that x follows y in the order on the tree. For example, assuming the document order for a tree representation of an XML document, the child and descendant relations are both forward relations, whereas the parent and ancestor relations are both backward relations.

FIG. 1 illustrates the tree representation of an XML document. For simplicity, we focus on elements and ignore such items as attributes and text nodes. The tree 100 therefore, consists of the virtual root 101 and the elements of the document. To avoid confusion between the XML document tree 100 and the tree representation of the XPath (described later), we use elements to refer to the nodes of the XML tree 100. In XML tree 100, the labels in the boxes represent the element tags in the corresponding XML document, and the numbers in parentheses next to the labels denote the order in which the nodes are visited by the event-based parser. For example, node 102 X(1) represents an element with tag <X> and is the $1^{st}$ node visited by an event-based parser. For this ordering, it is evident that whenever an element (e.g. 102) is a child of another element (e.g. 101), then the child element follows the parent element in the order.

Figure 2:
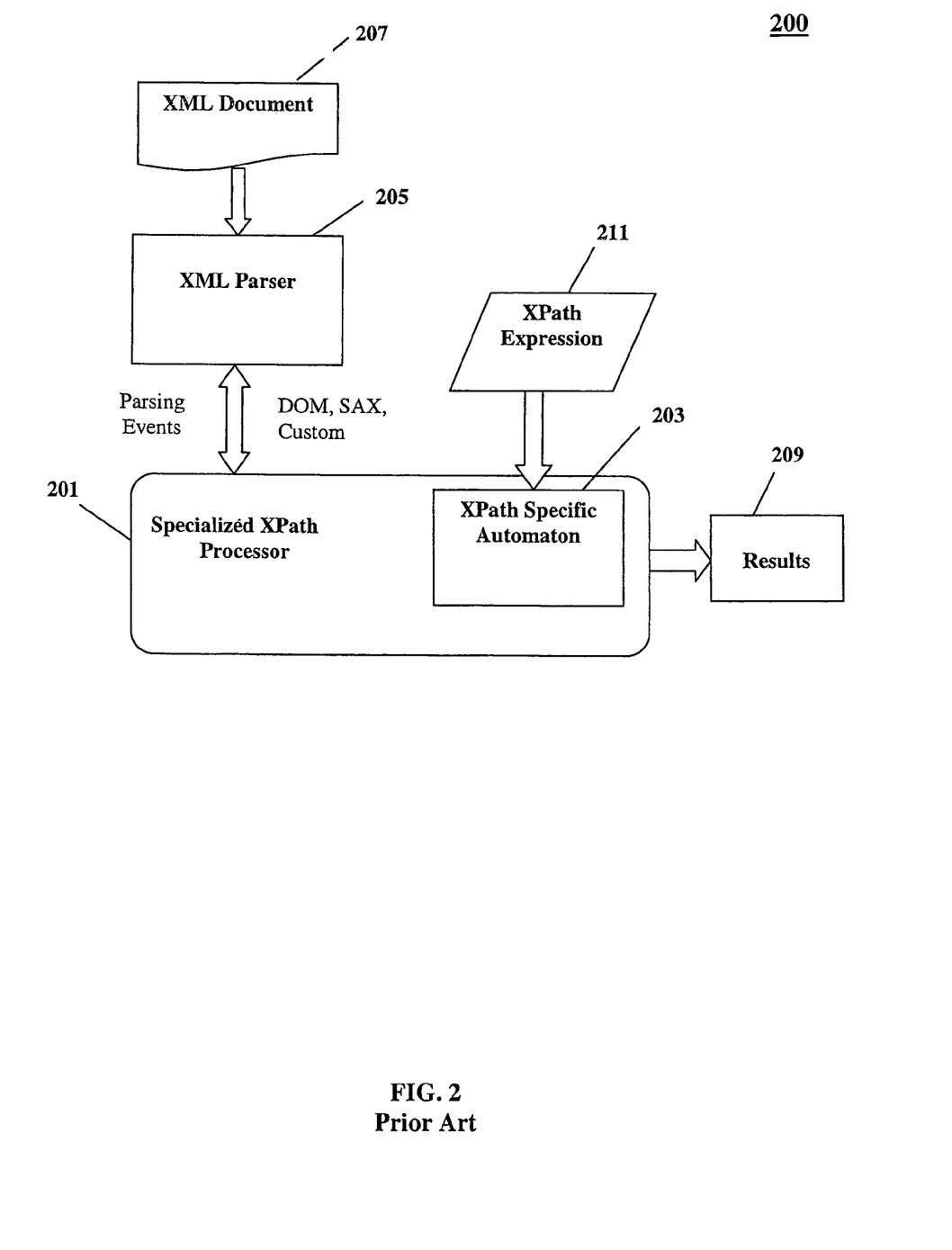
FIG. 2 is a block diagram of the structure of a streaming XPath processor, according to the prior art.

FIG. 2—Streaming XPath

A streaming XPath engine is structured as shown in FIG. 2. An XPath expression 211 is analyzed and represented as an automaton 203. The XPath engine 201 consumes events (for example, SAX events) produced by a parser 205, and for each event, the automaton 203 may make state transitions, and if necessary, store the element. At the end of processing the document 207 the XPath engine returns the list of elements 209 that are the result of the evaluation of the XPath expression 211.

Without streaming processing, when an XML document is received, it is processed and a tree representation is built. That entire tree representation must be kept in memory in order to perform XPath processing of an expression from that tree. With streaming processing, an entire tree is not built; instead events are processed as they are generated. This is why streaming processing is critical for infinite documents. With infinite documents, you cannot build a tree because the data is generated dynamically, and therefore, the size of the tree is not finite. An example of an infinite document would be a stock ticker document where the data (the stock prices) are being generated on the fly. The drawback to the current method of streaming processing of XML documents is that only forward axes can be handled. Given the central role that XPath plays in the XML stack, algorithms for improving the performance of evaluating expressive XPath expressions that contain uses of backward axes are essential.

SUMMARY OF THE INVENTION

According to the invention, a method for evaluating XPath expressions containing both backward (such as parent and ancestor) and forward (such as child and descendant) axes in a streaming fashion comprises a plurality of steps as set forth below. Known XPath processors can only handle forward axes. At any time during the processing of a document, this method retains only the minimal set of elements that are necessary for processing the document.

DESCRIPTION OF A PREFERRED EMBODIMENT

Figure 3A:
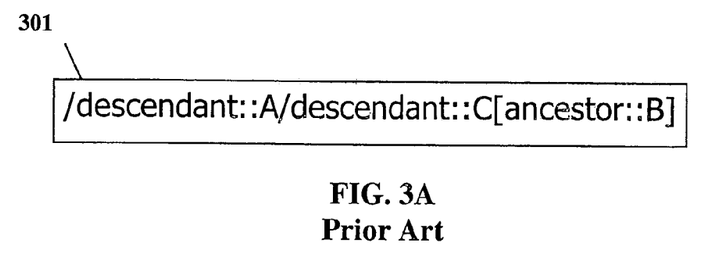
FIG. 3A shows an XPath expression.
Figure 3B:
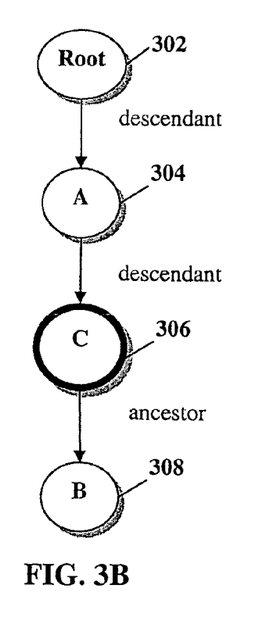
FIG. 3B shows a tree representation of the XPath expression of FIG. 3A, according to an embodiment of the invention.
Figure 3C:
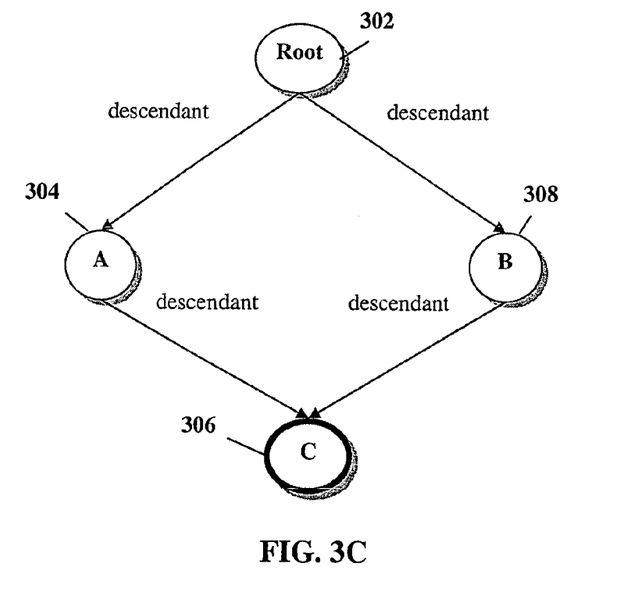
FIG. 3C shows a directed acyclic graph representation of the XTree of FIG. 3B, according to an embodiment of the invention.

FIGS. 3A, 3B, and 3C—XPath Expression, Tree Representation, and DAG Representation of XML Document Suppose we have a tree in which every node is labeled with a tag (where the same tag may appear on more than one node). Consider the problem of finding all nodes labeled C in the tree such that these nodes have both an ancestor labeled A and an ancestor labeled B. This corresponds to the XPath expression shown in FIG. 3A: /descendant::A/descendant::C[ancestor::B], labeled 301. A tree representation of this expression is provided in FIG. 3B and a directed acyclic graph (DAG) version is provided in FIG. 3C, with nodes labeled 302, 304, 306, and 308.

Figure 4:
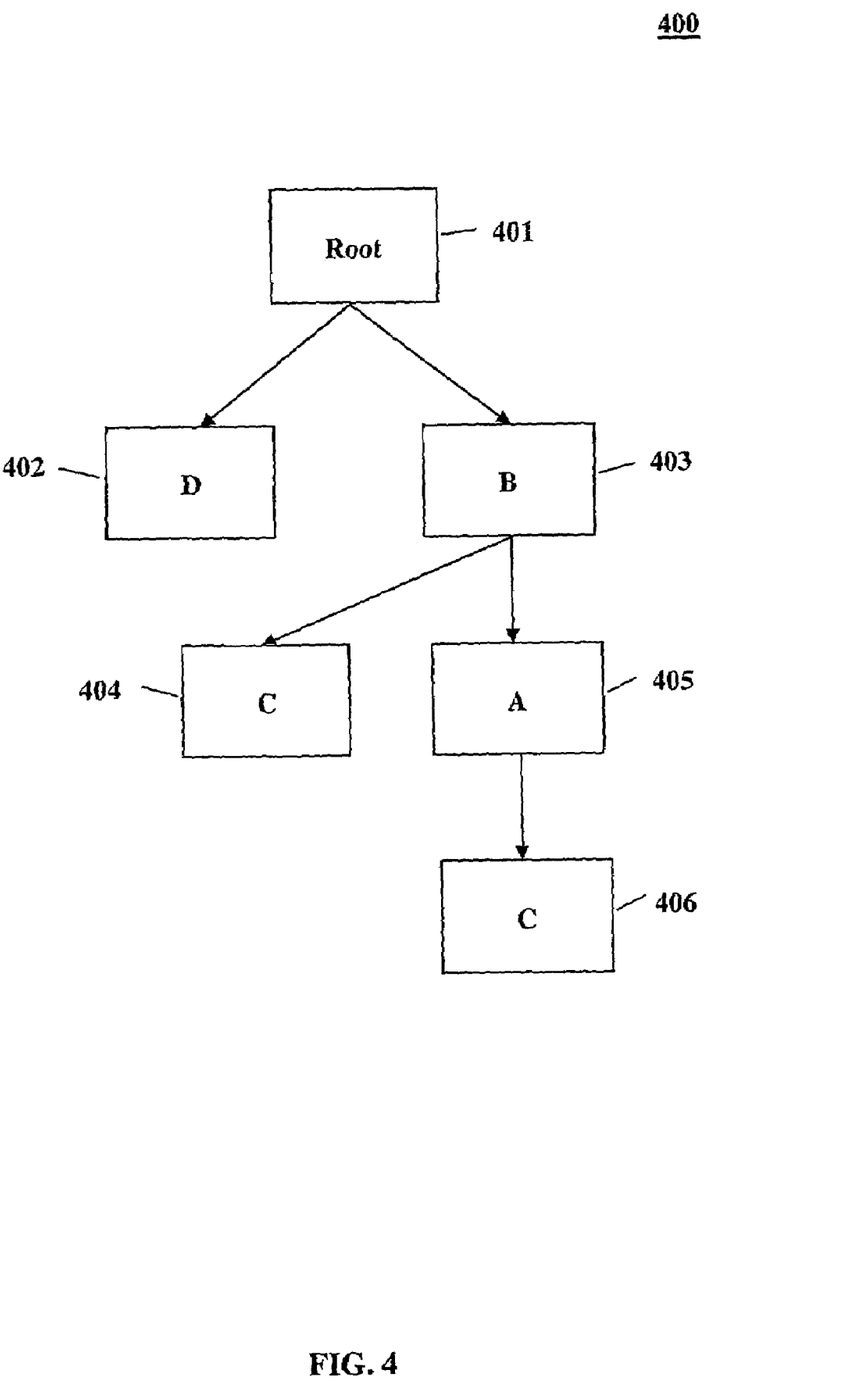
FIG. 4 shows a tree representation of an XML document.

FIG. 4—Tree Representation of an XML Document

For example, consider the tree shown in FIG. 4. Consider the two nodes 404 and 406, both of which are labeled C. The node 404 has an ancestor 403 labeled B but no ancestor labeled A. Consequently node 404 does not satisfy the requirement. But node 406, on the other hand, has both an ancestor 403 labeled B and an ancestor 405 labeled A, and therefore, satisfies the requirement.

Our requirements can be expressed in terms of a set of constraints, each of which takes the form S1→S2 where S1 and S2 are sets of labels. The tree in FIG. 3B and the DAG in FIG. 3C are both equivalent pictorial representations of these constraints. They are used to convert the input XPath expression into a set of constraints. For example, the above XPath expression can be expressed as the following set of constraints:

1 {Root}→{A,B}

2 {A,B}→{C}

3 {C}→{ }

Figure 5:
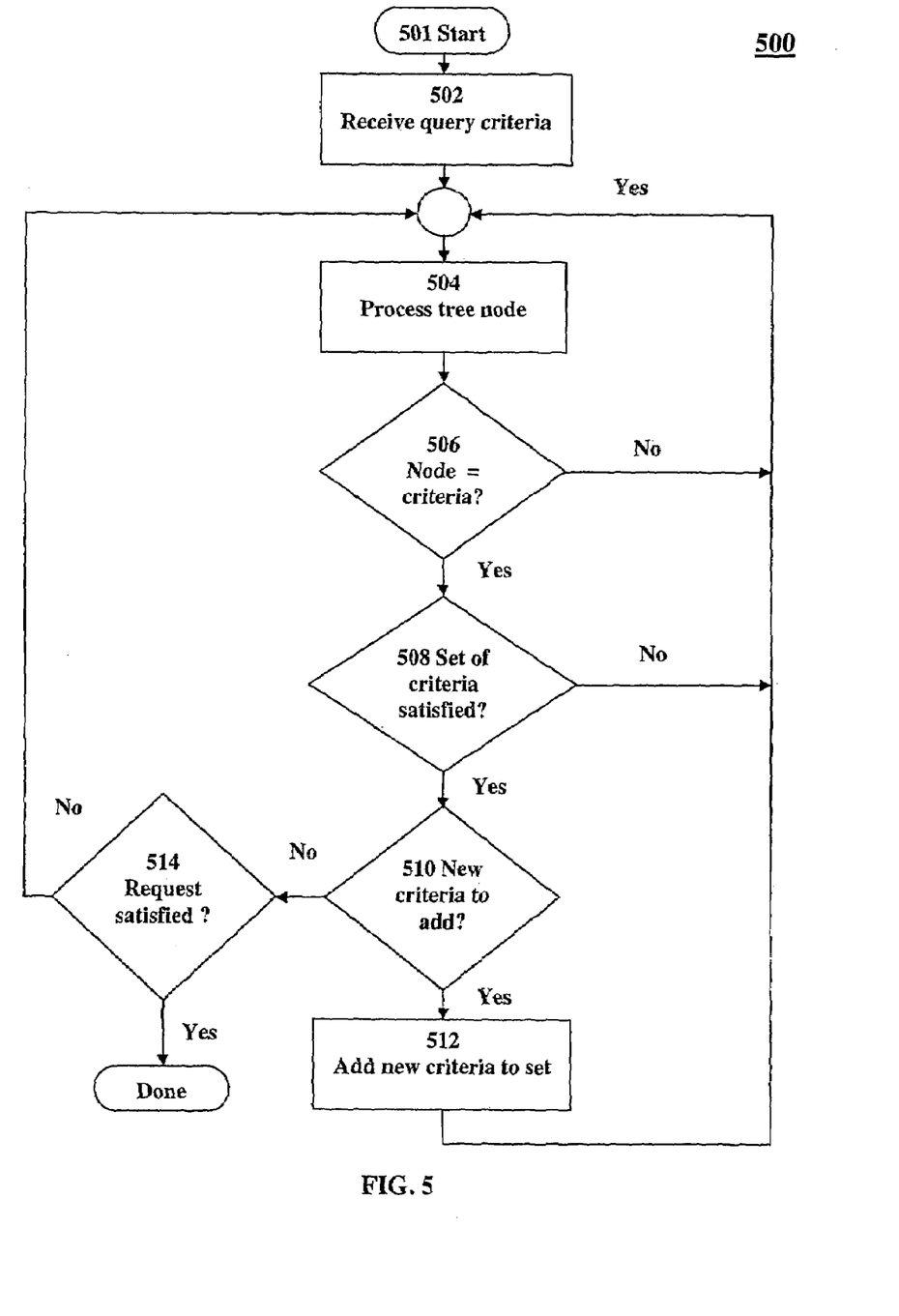
FIG. 5 shows a high-level flowchart of an embodiment of the invention.

FIG. 5—High-level Flowchart

Referring to FIG. 5 there is a flowchart showing how an algorithm according to an embodiment of the invention processes the tree of FIG. 4 and a set of constraints to compute the set of nodes 406 labeled C that satisfy the above constraints. The flowchart implicitly assumes that the tree is traversed using the following steps starting at root (as would be done by an event-based parser):

1. Issue a "start" node event;
2. Recursively visit the children in left to right order; and
3. Issue a "close" node event.

Figure 6:
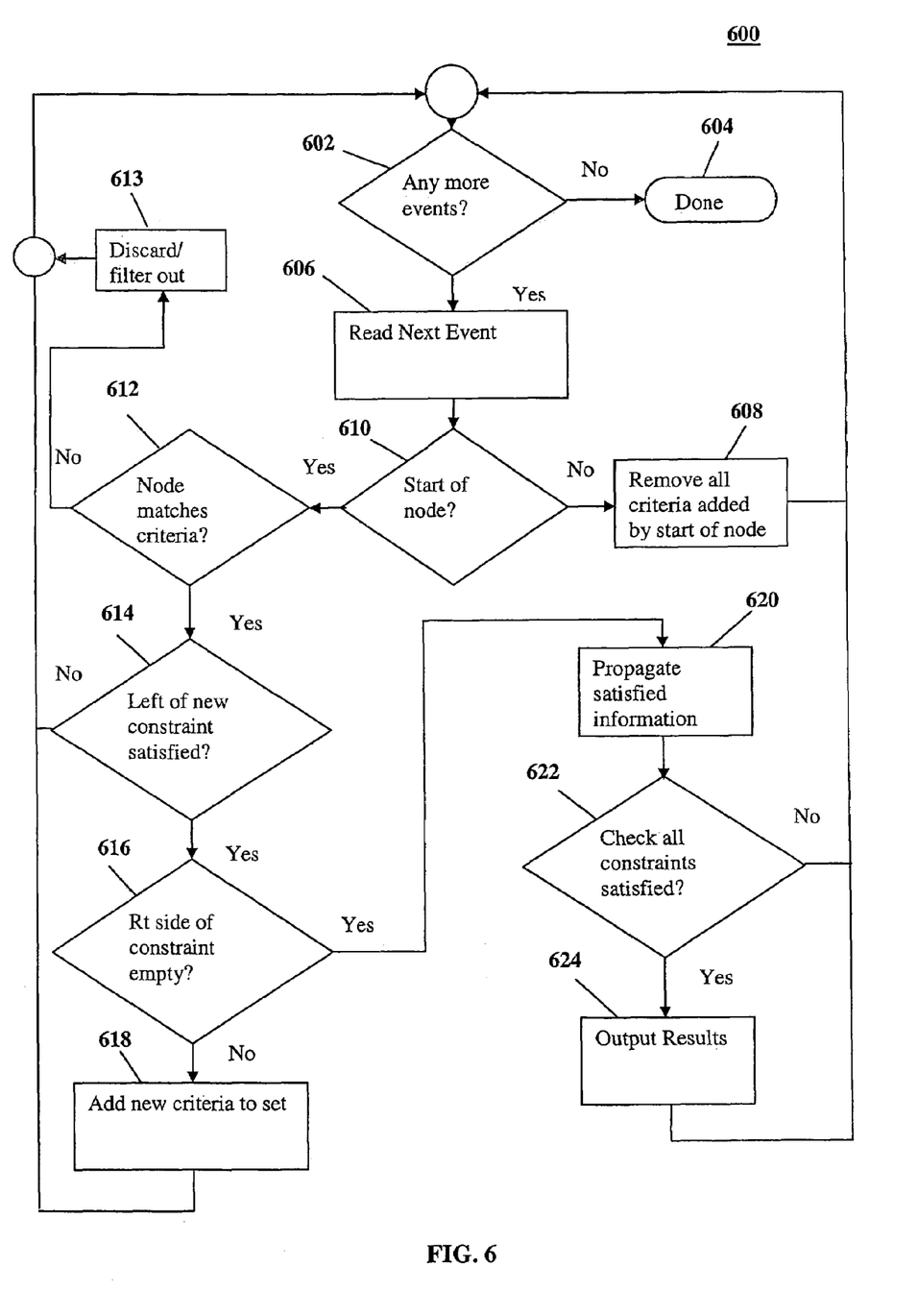
FIG. 6 shows a detailed flowchart of an embodiment of the invention.

We start with a set of active criteria 502. In this example, the only active criterion when we start is {Root}. For each node processed in 504, we check to see if the node matches any of the active criterion in step 506. If it does, then the algorithm checks to see whether the set of criteria corresponding to the left-hand side of any constraint is fully satisfied in step 508. If it is, then in step 510 we check to see whether the set of criteria in the right-hand side of the constraint is empty or not. If it is not empty, we add this set of criteria to the set of active criteria in step 512. If the set is empty, we check to see if all constraints have been satisfied in step 514. If so, then we have found a solution. Otherwise, we proceed to process the next node. A more detailed, step-by-step description of the process is documented in the flowchart of FIG. 6. The algorithm proceeds as follows:

FIG. 6—Detailed Flowchart

1. When we see the start event for node 401 labeled "Root", in 610, we check whether the event is a start or close event. Since this is a start event, we next check whether the node matches any active criterion in step 612. In this case, we find a match. Next, we determine if any new criterion needs to be added. In order to do that, we determine if any of the already satisfied criteria completely satisfies the left-hand side of any of the constraints in step 614. In this case, we determine that the left-hand side of the constraint {Root}→{A,B} is completely satisfied. For all such constraints, we add the criteria in the right-hand side to the set of active criteria. In this case, the criteria A and B are added to the set of active criteria in step 618. Processing returns to step 602 to check for any more events. Since there is another event to process, as determined at decision step 602, that event is read in step 606.

2. Next we proceed to step 606 to process another tree event and see the start event for node 402 labeled D. After decision step 612 we see that this event does not match any of the active criteria, and is therefore discarded, or filtered out, in step 613.

3. Next we see the close event of node 402 labeled D. Since no criteria were added when we saw the start of node 402, no criteria needs to be removed from the active set in 608, thereby taking us back to step 602 to process another event.

4. Next we see the start event of node 403 labeled B. This node matches one of the active criteria, determined in step 612. However, no new criteria can be added as a result of this event because a complete set of criteria in the left-hand side of a constraint has not been satisfied.

5. Next, we see the start event for node 404 labeled C. This node also does not match any of the active criteria, determined in step 612, and is discarded in step 613.

6. Next we see a close event for node 404 labeled C which also leads to no change.

7. Next we see the start event for node 405 labeled A, in step 610. This matches one of the active criteria, as determined in decision step 612. Moreover, now the left-hand side of the constraint {A,B}→{C} is fully matched in step 614 which causes the criterion C to be added to the active set in step 618.

8. Next we see the start event for node 406 labeled C in step 610. After determining, in step 612, that this event matches an active criterion, it is determined in step 614 that this event further fully satisfies the left-hand side of the constraint {C}→{ }. After checking that the right-hand side of the constraint is empty in step 616, we propagate the matching information in step 620. At this point, we check to see if all the constraints have been satisfied in step 622, which is true in this case. Consequently, we output node 406 as a solution node in step 624.

9. Next we see the close event for node 406, which has no effect.

10. Next we see the close event for node 405, which caused C to be removed from the set of active criteria in step 608.

11. Next we see the close event for node 403, which has no effect.

12. Finally, we see the close event for node 401, the root node, which causes A and B to be removed from the active set in step 608, and after concluding that there are no more events to process in step 602, the algorithm terminates at 604.

Figures 7A, 7B:
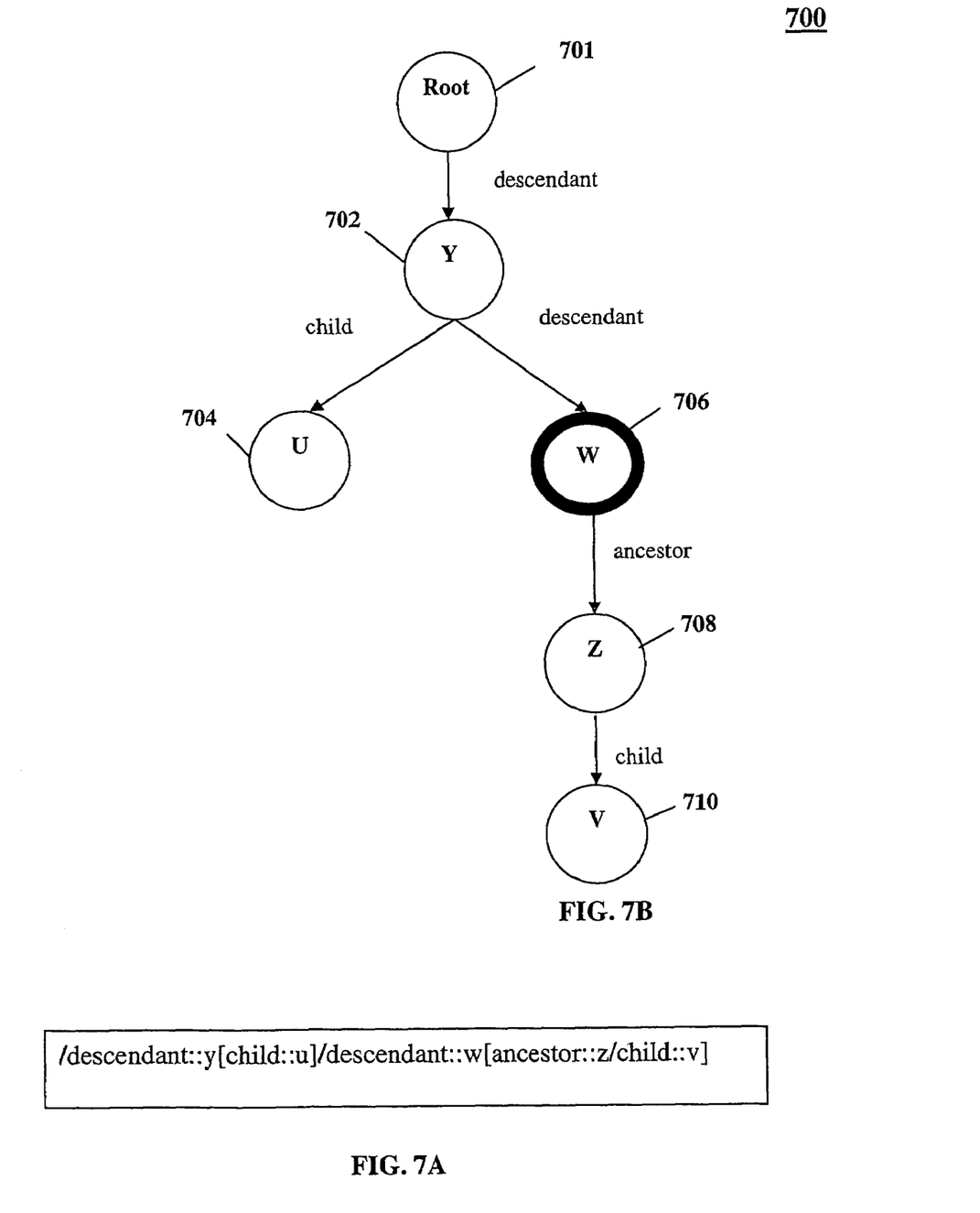
FIG. 7A shows an XPath expression.
FIG. 7B shows an XTree representation of the XPath expression of FIG. 7A, according to an embodiment of the invention.

FIGS. 7A and 7B,—an XPath Expression and its XTree Representation, respectively This algorithm operates on two representations of an XPath expression called XTree and XDAG. Referring to FIG. 7B you will see an XTree 700 representing the XPath expression of FIG. 7A. The circle corresponding to W 706 has a thick edge to represent the fact that it is the output node.

We represent an XPath expression as a rooted tree, called XTree (T), with labeled vertices (V) and edges (E), such that T=(Vτ, Eτ), where the root node 701 is labeled Root. We will use the term Restricted XPath, or Rxp, to refer to the input XPath expression in FIG. 7A. We use the term x-node to refer to the vertices of an XTree. The x-nodes in FIG. 7B are shown as circles numbered 701, 702, 704, 706, 708 and 710. The XPath expression in FIG. 7A comprises a number of steps of the form x::y. For example, one of the steps appearing in the XPath expression is descendant::w. For any step x::y, we call x the axis of the step and y the NodeTest. For example, in the step descendant::w, the axis is "descendant" and the NodeTest is "w". An element in the document matches a NodeTest if its tag is the same as the NodeTest. For each NodeTest in the expression, there is an x-node in the XTree labeled with the NodeTest. Each x-node (with the exception of Root 701) has a unique incoming edge, which is labeled with the Axis specified before the NodeTest. One of the x-nodes is designated to be the output x-node. In this case it is node 706. There are functions, label: $V\tau \rightarrow$String, and axis: $E\tau \rightarrow$ {ancestor, parent, child, descendant} that return the labels associated with the x-nodes and edges respectively. Rules for building an XTree from an Rxp are provided in Appendix A.

Figure 8:
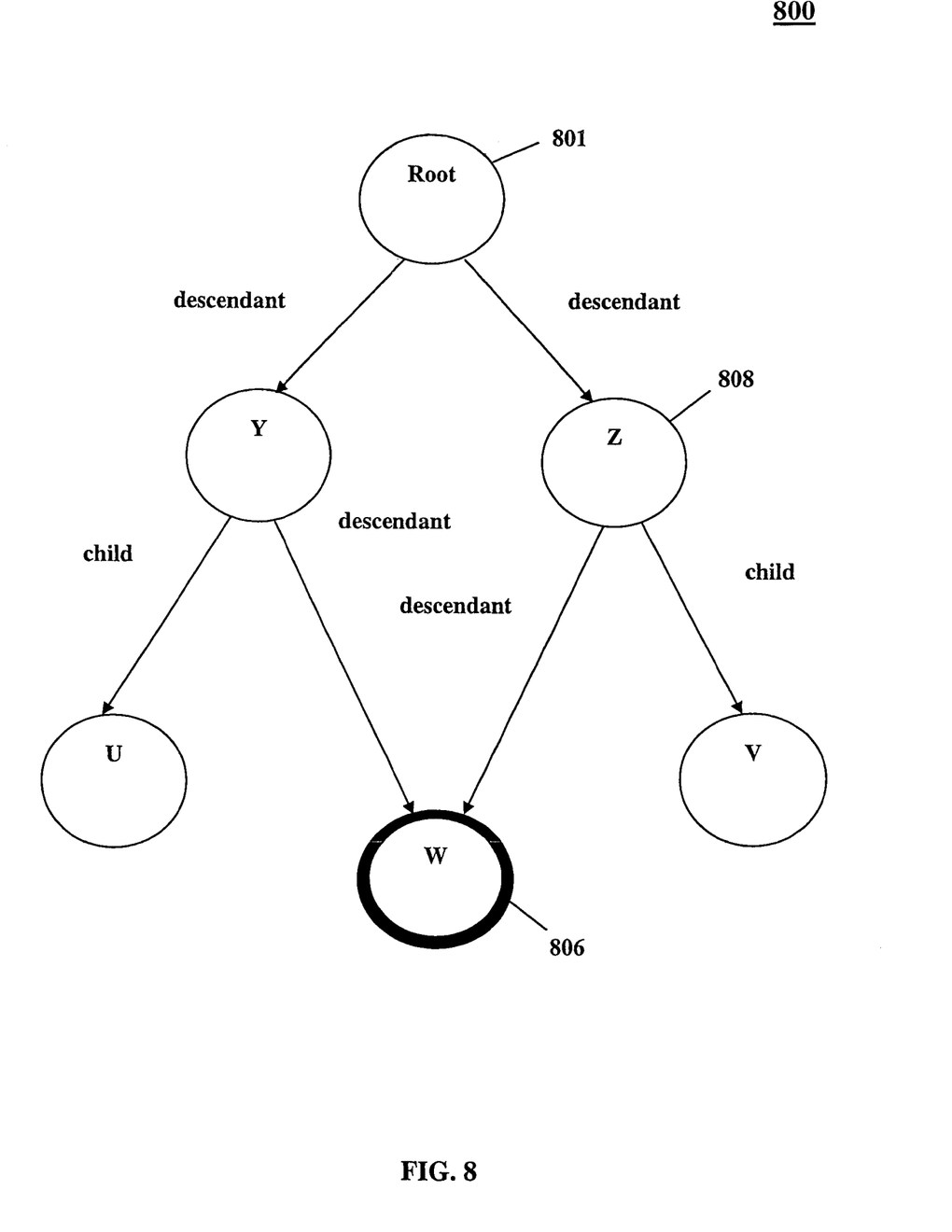
FIG. 8 shows an XDAG representation of the XTree in FIG. 7B according to an embodiment of the invention.

FIG. 8—XDAG Representation of the XPath Expression of FIG. 7A.

The XDAG is a key construct in this method since it converts backward constraints, such as parent, into forward constraints, thus making streaming processing possible for expressions that contain backward axes. An XDAG is a graph representation of an internal data structure created from an XPath expression. It represents the XPath expression and all of its constraints.

Converting backward constraints into forward constraints is accomplished by modifying the constraints without modifying the meaning of the query. To illustrate, earlier we used the example of finding all nodes "John" with an ancestor node named "Fred." With the XDAG representation, we would modify the constraint to look for all "Fred" nodes, and then find all descendant nodes named "John" of these "Fred" nodes rather than the original constraint of "find a 'John' node with an ancestor 'Fred'." FIG. 8 shows an XDAG representation of the XPath expression shown as an XTree 700. The XDAG 800 is obtained from the XTree 700 by reformulating the ancestor and parent constraints in the tree as descendant and child constraints. You can see a pictorial example of changing a backward (ancestor) constraint to a forward (descendant) constraint by viewing FIG. 7B and FIG. 8. In FIG. 8 you see the line (edge, or e) from the x-node (vertex, or v) W 806 (designated as $v_1$) to Z 808 (designated as $v_2$). That edge (e=$v_1$, $v_2$) is labeled as "descendant," whereas in FIG. 7 the edge from W 706 to Z 708 (e=$v_1$,$v_2$) is labeled as "ancestor".

The XDAG 800 can further be described as a directed, acyclic graph representation of an Rxp. More precisely, it is a directed, labeled graph (G) bounded by edges and vertices, such that G=($V_g$, $E_g$), with the same set of vertices as the XTree 700 (T), and edges defined as follows:

1. Edges in T 700 labeled child or descendant are also edges of G 800. If you look at FIG. 7B, it shows four edges labeled as child or descendant. FIG. 8 displays those edges, as well.

2. For each edge in T 700 labeled parent, there is an edge joining the same nodes but with direction reversed and label changed to child in G 800. Similarly, ancestor edges in T 700 are reversed and relabeled as descendant edges in G 800. FIG. 7B shows the edge from W 706 to Z 708 labeled as "ancestor," whereas FIG. 8 shows the edge from Z 808 to W 806 labeled as "descendant."

3. For any non-root x-node v ∈ G having no incoming edges, a descendant edge is added from Root 801 to v. Since the edge from W 706 to Z 708 in T 700 was relabeled to "descendant," Z 708 now has no incoming edges, therefore in FIG. 8, an edge has been added from Root 801 to Z 808, now making Z 808 a descendant of Root 801.

It is important to note that the XDAG 800 is a directed, acyclic graph. For XPath expressions that use backward axes, the method above will always generate a directed acyclic graph and not a tree.

We use an alternate semantics of XPath expressions defined on XTrees based on the notion of matchings. This semantics is equivalent to the semantics provided in the XPath 1.0 specification. The construction of the matching structure, a compact representation of matchings, is the main goal of the algorithm. We describe these concepts in this section.

Figure 9:
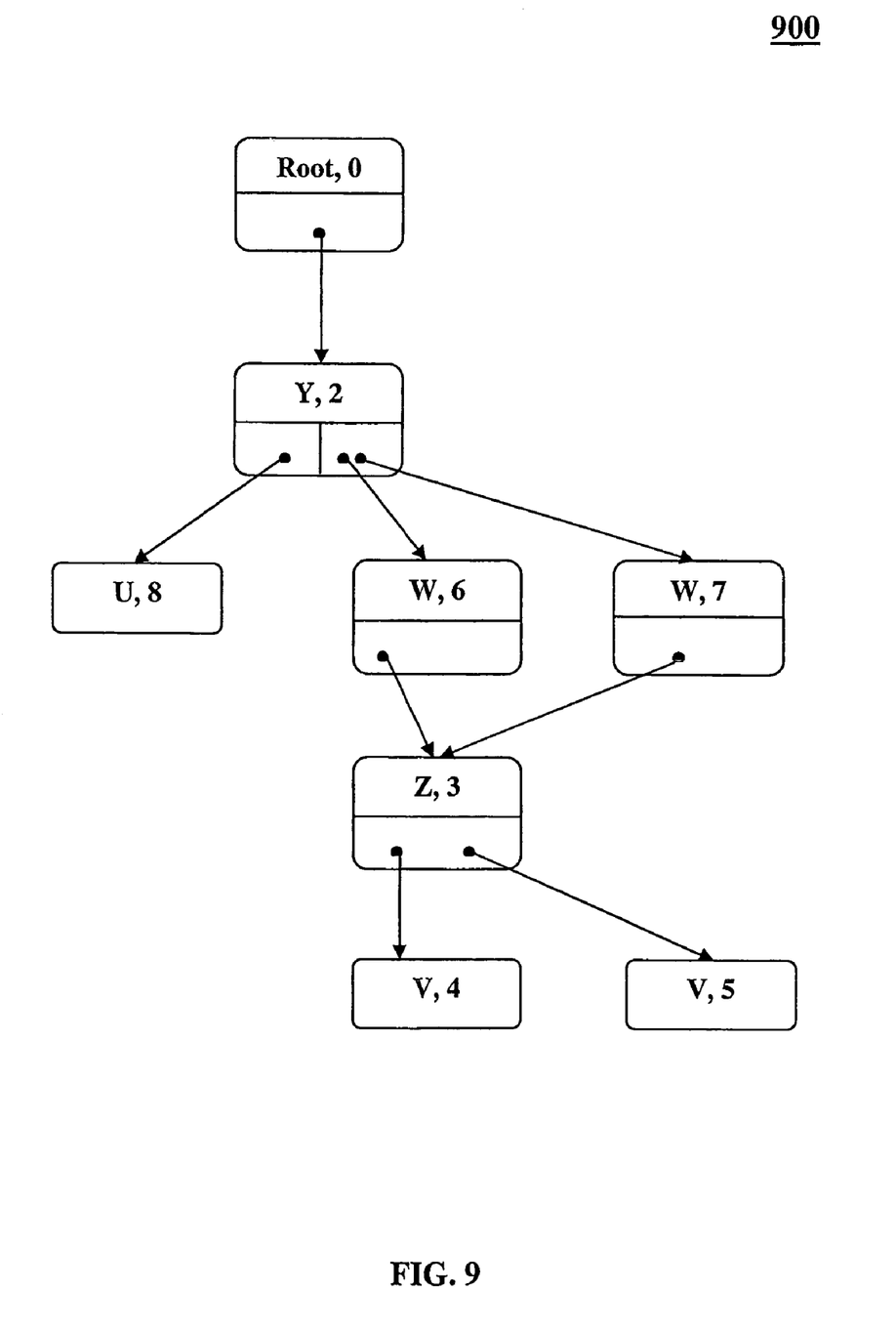
FIG. 9 is a block diagram representation of the matching structure at the end of processing the XPath expression of FIG. 7A on the XML document 100 of FIG. 1, according to an embodiment of the invention.

FIG. 9—Matching-Structure

This method processes events as they are generated by an event-based parser by operating over both the XTree and XDAG views of the input expression 211. We will refer to the input XPath expression 211 here as restricted XPath, or Rxp. At the end of processing the document the result of the Rxp expression is encoded in M. For efficiency, this method filters out events that do not contribute to any matchings. Only relevant events are processed to build matching-structures. We shall describe these steps in this section. A walkthrough of the execution of the algorithm on the Rxp of FIG. 7A and the document 100 of FIG. 1 is provided in Appendix B.

Let $v_1$ and $v_2$ be two x-nodes in an XTree T connected by an edge e, and let $d_1$ and $d_2$ be two elements in a document D. We say that the pair ($v_1$,$d_1$) is consistent with ($v_2$,$d_2$) (relative to XTree T and document D) if $d_1$ and $d_2$ satisfy the relation axis(e). For example, if $v_1$ and $v_2$ are connected by an edge labeled ancestor, then $d_2$ must be an ancestor of $d_1$ in D. A matching, m: $V_T \rightarrow V_D$, is a partial mapping from x-nodes of XTree T to elements of document D such that the following conditions hold:

1. For all x-nodes v ∈ domain(m), label(v)=tag(m(v)), i.e. all mapped vertices satisfy the NodeTest.

2. For all x-nodes $v_1$ and $v_2$ connected by an edge in T such that $v_1$,$v_2$ ∈ domain(m), ($v_1$,m($v_1$)) is consistent with ($v_2$,m($v_2$)).

A matching is at an x-node v if and only if its domain is contained in the sub-tree rooted at v. A matching at v is total if its domain contains all the vertices of the subtree rooted at v. It is easy to show that a document element n is in the result of an Rxp r, if and only if, there exists a total matching at Root for the XTree T of r, where the output x-node of T is mapped to n. This method computes the result defined by Rxp precisely in this manner. It finds all matchings from $V_T$ to $V_D$, and emits the document elements that correspond to the output x-node.

The algorithm constructs a data structure called a matching-structure which is a compact representation of all total matchings at Root of the Rxp relative to the input document 207. A matching-structure, $M_{v,e}$ is associated with x-node v, and represents a set of matchings at v in which v is mapped to the document element e. The matching-structure $M_{v,e}$ additionally contains a submatching for every child of v in the XTree. A submatching at child w of v is a (possibly empty) set of matching-structures at w. For any matching-structure $M_{v,e}$ in the submatching of $M_{v,e}$ at w, we require that (v,e) be consistent with (w, é). A matching-structure $M_{v,e}$ is said to be a parent-matching of a matching-structure $M_{w,e}$ if v is a parent of w in XTree T and (v,e) is consistent with (w, é). If $M_{v,e}$ is a parent-matching of $M_{w,e}$, then we say also that $M_{w,e}$ is a child-matching of $M_{v,e}$ FIG. 9 shows the matching structure at the end of processing the XPath of FIG. 7A on the document 100 in FIG. 1, and the four total matchings at Root 801. The boxes in FIG. 9 represent matching structures. For a matching-structure, $M_{v,e}$ the top half of the box shows (v,id(e)). Each slot in the bottom half of the box corresponds to a submatching, which is represented as a list of pointers to the child matchings. The result is obtained by taking the W projection, that is {$W_{6,4}$, $W_{7,5}$}:

Total Matchings at Root:
[Root →0,Z→3,Y→2,U→8,V→4,W→6]
[Root →0,Z→3,Y→2,U→8,V→4,W→7]
[Root →0,Z→3,Y→2,U→8,V→5,W→6]
[Root →0,Z→3,Y→2,U→8,V→5,W→7]
Solution: {$W_{6,4}$, $W_{7,5}$}

Filtering Events

At any point during execution, the algorithm has processed a prefix of the input document 207. An infinite number of XML documents share the same prefix, and so the future sequence of events that will be generated by the parser cannot be predicted. An element, e, is relevant if there exists some document completion where e participates in a matching. All relevant elements must be processed. As elements are processed, new relevant elements may be seen, or elements that were earlier deemed relevant may no longer be relevant. The XDAG representation of the Rxp is used to determine if an element is relevant.

An element that does not match any x-node is not relevant since it cannot participate in any matching. These elements are discarded. Let open elements be those elements for which we have seen a start element event, but not an end element event. By virtue of the depth-first manner in which events are generated, at a start element event for element e that matches an x-node v, the open elements are ancestors of e in the document. If for some parent of v' of v in the XDAG, there is no open, relevant element, e', such that (v,e) and (v',e') are consistent, then e cannot be relevant. There is no sequence of events which a parser can generate in which that constraint will become true, and therefore, e cannot contribute to any matching. For the XDAG in FIG. 8, no element that matches W will be relevant unless there are open relevant elements that match Y and Z.

At every step, we maintain a looking-for set, L, which allows us to evaluate whether the element associated with the next start element event is relevant. The members of L are (v∈ $V_p$, level) pairs, where level may be an integer or *. The element e associated with a start element event is relevant if and only if there exists (v,level)∈ L, label(v)=tag (e), and (level=level(e) or level=*). Integer levels are used to enforce the constraint that if (v,e) and (,v'e') are consistent and if axis(v,v')=child, then level(v')=1+level(v).

We assume from now on that all events corresponding to elements that are not relevant have been discarded. When this algorithm processes a start element event for an element e that matches an x-node, v, it creates a matching-structure, $M_{v,e}$ to represent the match. Note that e may match more than one x-node in the XTree 700; a matching-structure is created for each such match. The submatchings for these matching-structures are initially empty. The algorithm stitches together these matching-structures, so that when the end of the document is seen, $M_{Root,Root}$ encodes all total matchings at Root in the document.

The key step in this process is propagation. At an end element event for an element e that matches x-node v, we attempt to determine if $M_{v,e}$ represents a total matching at v. If there is a total matching, we insert $M_{v,e}$ into the appropriate submatching of its parent-matchings. This propagation may be optimistic in that one may have to undo the propagation as more events are processed. Let us first, however, consider the simpler situation where no cleanup of propagation is necessary, when the XTree 700 does not contain any edges labeled ancestor or parent. This corresponds to Rxps that use only the child and descendant axes, that is, that do not have any backward axes.

When the XTree 700 contains only child and descendant constraints, any total matching m at v, where m(v)=e maps all x-nodes in the subtree of v to elements that lie in the document subtree of e. Since the total matching is contained within the subtree of e, by the time the end element event for e is seen, we can determine conclusively if $M_{v,e}$ represents a total matching at v. This leads naturally to an inductive approach to building matchings. For an end element event e, where $M_{v,e}$ is a matching-structure:

1. If v is a leaf in the XTree 700, $M_{v,e}$ represents a total matching at v by definition (v has no subtrees). We propagate $M_{v,e}$ to the appropriate parent matchings.
2. If v is not a leaf, $M_{v,e}$ represents a total matching at v, if and only if, all submatchings are non-empty. Otherwise, no total matching exists. If we had found appropriate total matchings for each of the children of v in the XTree, they would have been propagated to $M_{v,e}$ by the time the end element event for e is processed. As above, if $M_{v,e}$ represents a total matching, we propagate it to all appropriate parent-matchings.

If at the end of processing the document 207 (when we receive the end element event for Root) the algorithm finds that all the submatchings of $M_{Root,Root}$ are non-empty, we have a total matching at Root.

The presence of ancestor and parent edges in the XTree 700 complicates this process because one may not be able to determine conclusively whether a total matching exists for a $M_{v,e}$ by the end of element e. For example in FIG. 7B, one might not find a total matching for the subtree rooted at Z, until after one sees the end event for an element matching W. The propagation process remains the same, except for an x-node that has an incoming or an outgoing edge labeled ancestor or parent. The modified steps are as follows:

1. If there is an outgoing edge (v,v') labeled ancestor or parent, and the submatching for v' is empty, we cannot assert that there exists no total matching at v. We, optimistically, propagate each child-matching, $M_{v',e'}$; into the appropriate submatching of $M_{v,e}$. We then proceed as before. If all submatchings are satisfied, $M_{v,e}$ is propagated to its parent-matchings.
2. If there is an incoming edge (v',v) labeled ancestor or parent, then $M_{v,e}$ may have been propagated optimistically to its parent-matchings. If we can determine conclusively that $M_{v,e}$ cannot represent a total matching at v, we undo the propagation of $M_{v,e}$. The removal of $M_{v,e}$ from a submatching of a parent-matching $M_{v',e'}$, may result in that submatching becoming empty—$M_{v', e'}$ is no longer a total matching at v'. We then recursively undo the propagation of $M_{v',e'}$ from its parent-matchings.

At the end of processing the document 207, if the submatchings of $M_{Root,Root}$ are all non-empty, we have at least one total matching at Root. The output is emitted by traversing the matching structure 900 shown in FIG. 9, and emitting an element e when we visit $M_{v,e}$ where v is the output x-node of the Rxp. For example, in FIG. 9 we output $W_{6,4}$ when we first visit $M_{w,6}$ and $W_{7,5}$, when we first visit $M_{w,7}$.

This algorithm has been described in terms of storing all matches, and subsequently, traversing the matching structure to emit elements. We do not, however, need to build matching-structures for many of the x-nodes in the XTree. For example, if the XTree contains a subtree that does not contain the output node, it is not necessary to store matching structures for the nodes in that subtree. It is sufficient to store a Boolean value as to whether the total matching exists at that subtree. Furthermore, often it is not necessary to wait until the end of a document to emit output. Elements could be emitted more eagerly.

One extension of XPath expressions, which has applications in databases, is to allow for more than one output node in an XPath. If we use "$" to mark output nodes, the extended XPath expression, //$a/$b returns all (a,b) pairs in an input document such that a is the parent of b. Our matching structure allows easy production of these tuples—the only change is in the output traversal.

Or expressions can be handled by converting an XPath expression into an equivalent one in "disjunctive normal form." The algorithm can be run on each of the operands of the top-level, or independently. While this process may be exponential in terms of the size of the XPath expression, we do not expect this to be an issue since XPath expressions are, in general, of small size.

Figure 10:
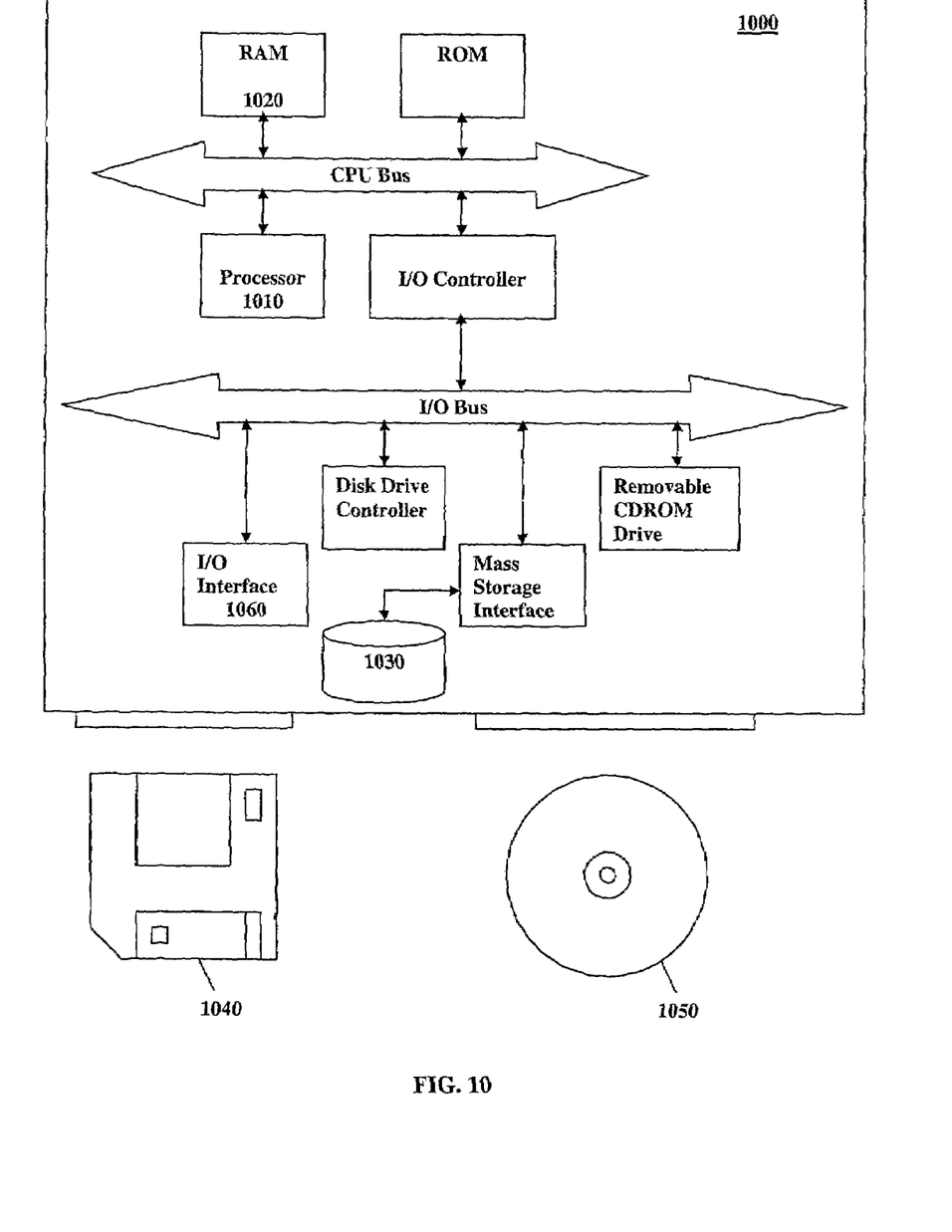
FIG. 10 is a simplified block diagram of an information processing system configured to operate according to an embodiment of the invention.

FIG. 10—Information Processing System

FIG. 10 is a simplified block diagram of an information processing system 1000 configured to operate according to an embodiment of the invention. The system 1000 comprises an input-output (I/O) interface 1060 which is adapted for receiving a query comprising search criteria. The criteria comprise a set of constraints specifying forward and backward relations among nodes. The I/O interface 1060 is further adapted to receive at least a portion of a document, such as an XML document 207 (e.g., by including an XML reader). The system 1000 further comprises logic for modifying the search criteria by reformulating some of the constraints specifying a backward relation into constraints specifying a forward relation; logic for creating an internal data structure; and logic for locating one or more nodes that satisfy the search criteria. This logic can be implemented as program instructions stored in either mass storage device 1030 or media such as a diskette 1040 or CD ROM 1050 for processing by the system processor 1010 from memory 1020. The system 1000 is only one possible implementation of methods and algorithms performed according to the invention. Those skilled in the data processing arts will appreciate that other implementations are possible within the spirit of the invention.

CONCLUSION AND SCOPE

This method is a novel algorithm for handling backward and forward axes in streaming XPath. The advantages of this method of processing streaming XPath expressions are: it only needs to store relevant portions of the document, so it saves memory space; it saves time in locating an expression because a section of the document is traversed only once; and, it saves money since the processing is faster due to the aforementioned benefits.

Therefore, while there has been described what is presently considered to be the preferred embodiment, it will be understood by those skilled in the art that other modifications can be made within the spirit of the invention.

What is claimed is:

1. A computer-implemented method for searching XML documents, wherein the XML documents comprise a tree structure comprising branches comprising a plurality of nodes, the method comprising the steps of:
    receiving a DAG (Directed Acyclic Graph) query comprising at least one XPath expression and search criteria and wherein the criteria comprise a set of constraints that specify relations among nodes, such that the relations specified in the set of constraints are forward relations and backward relations;
    receiving at least a portion of a XML document to be searched, the XML document comprising a tree structure, each branch comprising a plurality of nodes, wherein a relation between any two nodes is a forward relation and a backward relation;
    modifying the search criteria automatically such that constraints, specifying a backward relation are reformulated into constraints specifying a forward relation, and constraints specifying a forward relation are reformulated into constraints specifying a backward relation;
    searching the at least a portion of a XML document using the modified criteria; and
    locating one or more nodes that satisfy the search criteria.

2. The method of claim 1, wherein the step of modifying the search criteria comprises generating new criteria.

3. The method of claim 1, wherein the processing step comprises creating a graph representation of the query.

4. The method of claim 1, wherein the searching step comprises creating a tree representation of at least a portion of the XML document such that the forward and backward relations in the XML document to be searched are preserved in the tree representation.

5. The method of claim 4, further comprising filtering the XML document to exclude any nodes which do not match the search criteria.

6. The method of claim 1, further comprising building a matching structure comprising only those nodes which are relevant to the search criteria.

7. The method of claim 6, further comprising building the matching structure so that the structure commences at the root node.

8. The method of claim 1, wherein at least a portion of the XML document searched comprises less than the entire XML document.

9. The method of claim 1, wherein the XML document is an infinite XML document.

10. The method of claim 1, wherein the step of locating the node or nodes that satisfy the search criteria further comprises emitting that node or nodes as output.

11. The method of claim 1 wherein the constraints specify relations between nodes, the relations comprising parent and child relations.

12. The method of claim 1 wherein the constraints specify relations between nodes, the relations comprising ancestor and descendant relations.

13. A system for searching XML documents, the system comprising:
    an input for receiving a DAG (Directed Acyclic Graph) query comprising at least one XPath expression and search criteria and wherein the criteria comprise a set of constraints that specify relations among nodes, wherein the relation between any two nodes are a forward relation and a backward relation;
    an input for receiving at least a portion of a XML document to be searched, wherein the XML document comprises a tree structure comprising branches, each branch comprising a plurality of nodes, wherein a relation between any two nodes is a forward relation and a backward relation;
    logic for automatically modifying the search criteria such that constraints specifying a backward relation are reformulated into constraints specifying a forward relation, and constraints specifying a forward relation are reformulated into constraints specifying a backward relation;

a processor for processing the XML document using the modified search criteria; and logic for locating one or more nodes in the XML document that satisfy the search criteria.

14. The system of claim 13 wherein the logic for modifying the search criteria further comprises generating new criteria.

15. The system of claim 13 wherein the processor for processing the XML document further comprises logic for creating a graph representation of the query.

16. The system of claim 13, wherein the logic for processing comprises creating a tree representation of at least a portion of the XML document.

17. A computer-useable medium comprising program instructions for searching XML documents, the medium comprising instructions for:

receiving a query comprising at least one XPath expression and search criteria and wherein the criteria comprise a set of constraints that specify relations among nodes, such that the relations specified in the set of constraints are forward relations and backward relations;

receiving at least a portion of a XML document, wherein the XML documents comprise a tree structure comprising branches, each branch comprising a plurality of nodes, wherein a relation between any two nodes is a forward relation and a backward relation;

modifying the search criteria automatically such that constraints specifying a backward relation are reformulated into constraints specifying a forward relation, and constraints specifying a forward relation are reformulated into constraints specifying a backward relation;

processing the XML document using the modified criteria; and locating one or more nodes in the XML document that satisfy the search criteria.

* * * * *